(12) United States Patent
Wiemker et al.

(10) Patent No.: US 8,045,769 B2
(45) Date of Patent: Oct. 25, 2011

(54) PLANAR ANGULAR VISUALIZATION OF THE BRONCHIAL TREE

(75) Inventors: Rafael Wiemker, Kisdorf (DE); Thomas Blaffert, Hamburg (DE); Thomas Buelow, Grosshansdorf (DE)

(73) Assignee: Koninklijke Philips Electronics N V, Eindhoven (NL)

( * ) Notice: Subject to any disclaimer, the term of this patent is extended or adjusted under 35 U.S.C. 154(b) by 1148 days.

(21) Appl. No.: 11/719,549

(22) PCT Filed: Nov. 21, 2005

(86) PCT No.: PCT/IB2005/053829
§ 371 (c)(1), (2), (4) Date: May 17, 2007

(87) PCT Pub. No.: WO2006/056923
PCT Pub. Date: Jun. 1, 2006

(65) Prior Publication Data
US 2009/0148008 A1    Jun. 11, 2009

(30) Foreign Application Priority Data
Nov. 23, 2004  (EP) ..................... 04106013
Apr. 8, 2005   (EP) ..................... 05102793

(51) Int. Cl.
*G06K 9/00* (2006.01)
*A61B 6/00* (2006.01)

(52) U.S. Cl. .................... 382/128; 382/275; 378/21

(58) Field of Classification Search ............ 700/86; 378/21, 22, 23, 24; 382/128, 129, 130, 131, 382/132, 133, 134, 154, 162, 164, 168, 181, 382/190, 203, 209, 232, 240, 254, 274, 275, 382/276, 303, 305, 312
See application file for complete search history.

(56) References Cited

U.S. PATENT DOCUMENTS

| | | | |
|---|---|---|---|
| 4,569,014 A * | 2/1986 | Kishi et al. ................. 700/86 |
| 5,768,405 A * | 6/1998 | Makram-Ebeid ............ 382/128 |
| 6,556,696 B1 * | 4/2003 | Summers et al. ............ 382/128 |
| 7,469,073 B2 * | 12/2008 | Paladini et al. ............. 382/275 |
| 2003/0053697 A1 * | 3/2003 | Aylward et al. ............. 382/203 |

FOREIGN PATENT DOCUMENTS

| | | |
|---|---|---|
| GB | 2395880 A | 6/2004 |
| JP | 2004113537 A | 4/2004 |

OTHER PUBLICATIONS

Bartz et al: "Hybrid Segmentation and Exploration of The Human Lungs"; IEEE Visualization 2003, Seatfle, WA, Oct. 19-24, pp. 177-184, XP010671894.*

(Continued)

*Primary Examiner* — Seyed Azarian (57) ABSTRACT

A system (20) an image acquisition device, an image workstation, computer-readable medium and method for visualizing an anatomical tree structure is disclosed. The anatomical tree structure is segmented from a three-dimensional image set of at least a portion of a body. A planar angular visualization of the anatomical tree structure is then determined. The planar angular visualization of the anatomical tree structure is then displayed. Since the displayed anatomical tree structure has no occlusions or intersections of segments, the anatomical tree is much easier to read which facilitates subsequent automated or manual diagnosis of the tree for anomalies.

17 Claims, 8 Drawing Sheets

OTHER PUBLICATIONS

Bartz et al: "Hybrid Segmentation and Exploration of The Human Lungs"; IEEE Visualization 2003, Seattle, WA, Oct. 19-24, pp. 177-184, XP010671894.

Higgins et al: "Virtual Bronchoscopy for Three-Dimensional Pulmonary Image Assessment: State of the Art and Future Needs"; Radiographics, Radiological Society of North America, Oak Brook, US, vol. 3, No. 18, May 1998, pp. 761-778, XP008002476.

Raman et al: "Automated Generation of Curved Planar Reformations From volume Data: Method and Evaluation"; Radiology, vol. 223, No. 1, pp. 275-280, Apr. 2002.

Leonardi et al: "Curved CT Reformatted Images of Head Scans"; Journal of Computer Assisted Tomography, vol. 15, No. 6, pp. 1074-1076, Nov.-Dec. 1991, Raven Press, LTD, NY.

Schlatholter et al: "Simultaneous Segmentation and Tree Reconstruction of The Airways for Virtual Bronchoscopy"; SPIE Conference on Medical Imaging, Proceedings of SPIE vol. 4684, pp. 103-113 (2002).

* cited by examiner

PLANAR ANGULAR VISUALIZATION OF THE BRONCHIAL TREE

This invention pertains in general to the field of medical imaging. More particularly the invention relates to a method and an apparatus for planar angular visualization of an anatomical tree structure, and more particularly to a planar topological mapping of a three-dimensional bronchial tree structure of the lungs.

In helical computed tomography (CT) imaging, a patient is advanced linearly through the examination region along a direction that is perpendicular to a gantry rotation plane to effectuate a helical orbiting of the x-ray source about the subject. X-ray absorption data obtained during the helical orbiting is reconstructed using filtered back projection or another reconstruction method to generate a three-dimensional image representation of the subject or of a selected portion thereof.

High resolution CT data sets from multi-slice scanners allow the inspection of the bronchial down to smaller airways for diagnostic purposes. The resulting images can be used to inspect the airway lumen and wall thickness of the bronchia.

Figure 1:
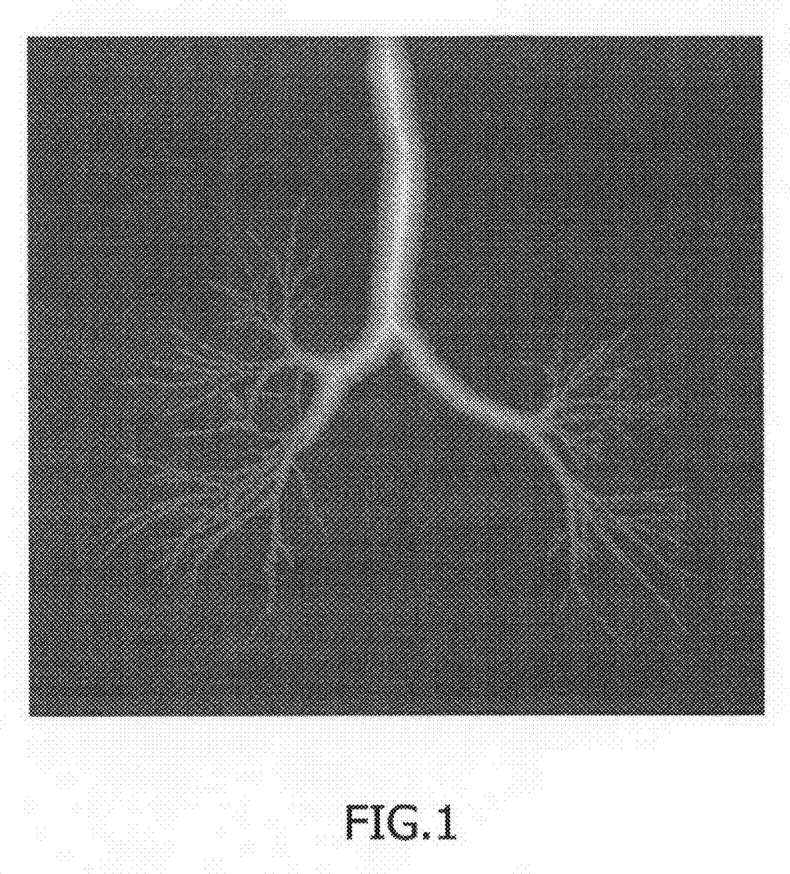
FIG. 1 illustrates a coronal projection of a bronchial tree as extracted from a particular CT lung data set.

The bronchial tree structure contains hundreds of subsegments. Therefore, a visual inspection of all paths in the three-dimensional bronchial tree is very time consuming. On the other hand, a planar projection of the three-dimensional tree leads to multiple occlusions, as illustrated in FIG. 1, and the continuation of the specific airway path is difficult to follow, due to the delicate structure of the tree.

Hence, an object of the present invention is to provide a system and method for providing an improved representation of a three-dimensional anatomical tree.

Accordingly, the present invention preferably seeks to mitigate, alleviate or eliminate one or more of the above-identified deficiencies in the art and disadvantages singly or in any combination and solves at least the above mentioned problems by providing a system, an image acquisition device, a method, a computer-readable medium and an image workstation that provides a planar angular visualization of an anatomical tree according to the appended claims.

The general solution according to the invention suggests a planar topological mapping of the three-dimensional bronchial tree structure of the lungs such that no occlusions or intersection of segments occur, that the hierarchy of the sub-segments is derivable, and that conveys a similarity to the true anatomical regions such as the lung lobes. In contrast to conventional geometric 3D-to-2D projections, this map allows inspection of the bronchial tree in a view, and with a low degree of freedom, for instance through a Graphical User Interface slider which varies the selected distance to the carina of all bronchial segments.

According to one aspect of the invention, a method is provided for visualizing an anatomical tree structure which comprises the following steps. The anatomical tree structure is segmented from a three-dimensional image set of at least a portion of a body. A planar angular visualization of the anatomical tree structure is then determined. The planar angular visualization of the anatomical tree structure is then displayed.

According to another aspect of the invention, a system for visualizing an anatomical tree structure is disclosed. Segmenting means segments the anatomical tree structure from a three-dimensional image set of at least a portion of a body. Determination means determines a planar visualization of the anatomical tree structure. Displaying means displays the planar angular visualization of the anatomical tree structure.

According to a further aspect of the invention, a computer-readable medium having embodied thereon a computer program, for automatic extraction of an anatomical tree structure, for processing by a computer is provided. The computer program comprises a code segment for segmenting the anatomical tree structure from a three-dimensional image set of at least a portion of a body; a code segment for determining a planar angular visualization of the anatomical tree structure; and a code segment for displaying the planar angular visualization of the anatomical tree structure.

The present invention has the advantage over the prior art that it provides a two-dimensional representation of an anatomical map in which occlusions or intersection of segments are minimized, i.e. do not occur, thus making the visual inspection of the paths of the anatomical tree much easier, thus facilitating subsequent automated or manual processing of the derived information, e.g. for analysis of the tree for anomalies.

These and other aspects, features and advantages of which the invention is capable of will be apparent and elucidated from the following description of embodiments of the present invention, reference being made to the accompanying drawings, in which.

The following description focuses on an embodiment of the present invention applicable to a computed tomography (CT) system and in particular to multi-slice CT data. However, it will be appreciated that the invention is not limited to this application but may be applied to many other imaging systems, including for example Magnetic Resonance Imaging (MRI) systems, a three-dimensional Rotational Angiography (3D-RA) scanner, Position Emission Tomography (PET) scanner, single Photon Emission Computed Tomography (SPECT) scanner, etc.

Below, an automated method for the extraction of an anatomical tree from multi-slice CT data is described. While much of the discussion of the invention will relate to a bronchial tree, it will be understood by those skilled in the art that the invention relates to any type of anatomical tree such as a vessel tree and the invention is not limited thereto.

Figure 2:
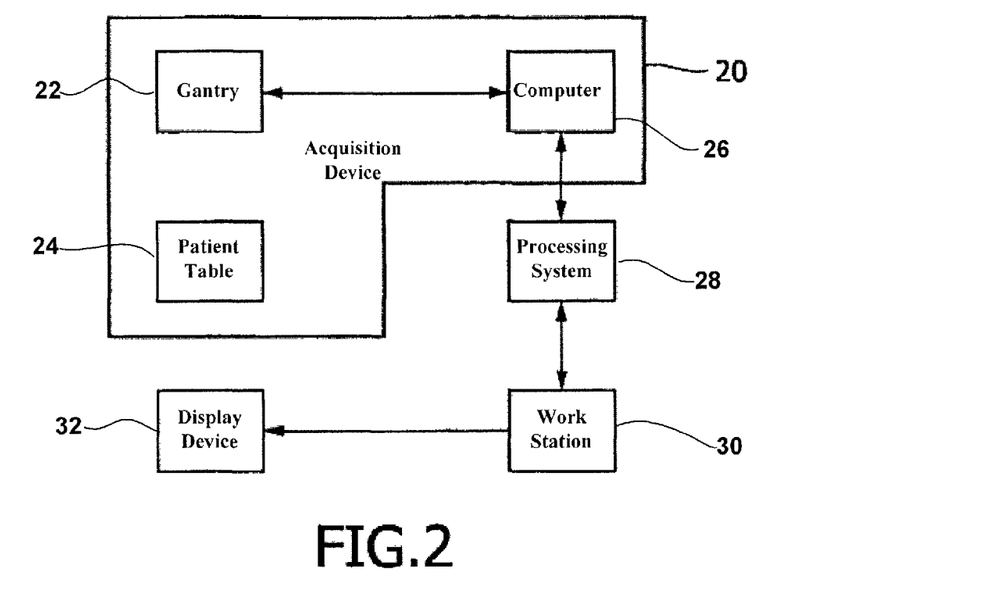
FIG. 2 illustrates a CT acquisition device according to one embodiment of the invention.
Figure 9:
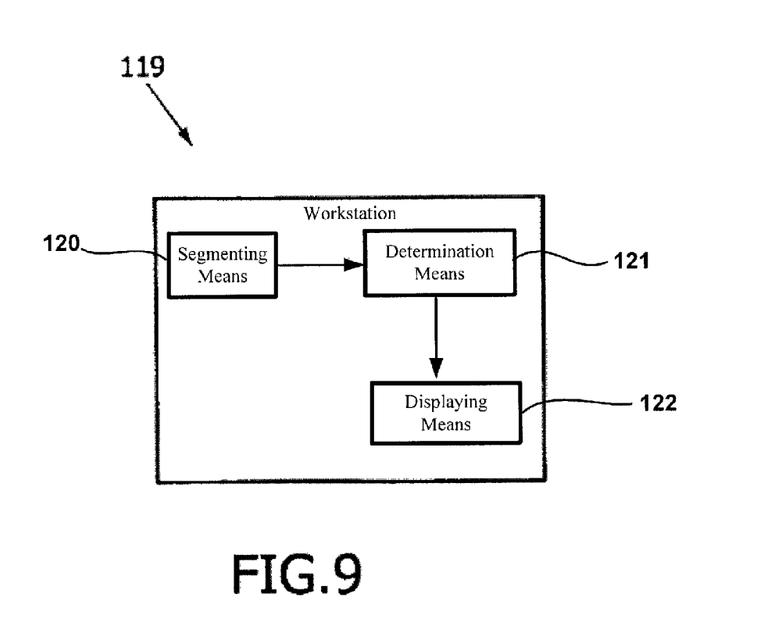
FIG. 9 illustrates an image workstation according to one embodiment of the invention.

An example of a CT acquisition device 20 according to one embodiment of the invention is illustrated in FIG. 2. The CT acquisition device 20 comprises a multi-array CT gantry 22 and a patient table 24 that can be positioned within the gantry 22. The patient table 24 supports a patient during acquisition of raw image data of the patient. The coarse image data is applied to a computer 26, which reconstructs volumetric image data of the raw image data. The computer 26 is programmed in such a manner that in conformity with the invention the computer 26 calculates a segmented tree of the tracheobronchial tree. The computer 26 then determines a planar angular visualization of the anatomical tree structure, the tree and visualization being displayed on a display unit of the computer. Alternatively, the reconstructed volumetric image data can be transferred to an image processing system 28 for processing the data according to the method of the invention. This image processing system 28 may be a suitably programmed computer of a workstation 30. The workstation 30, which will be described in more detail below with reference to FIG. 9, is connected to a screen 32. The system further comprises a microprocessor, a general purpose memory like random access memory (RAM) and a further memory that are being communicatively connected to each other through a software bus. The memory comprises computer readable software code designed to perform the method according to the invention. The memory is a display buffer that is designed to comprise the segmented tracheobronchial tree, the planar angular visualization and the original image set as previously described. The contents of this buffer are displayed at the display device 32. It is further possible to download the computer readable software from a storage device like a compact disk (CD), digital versatile disk (DVD) etc., or to download the computer readable software as such, e.g. from the Internet, into the memory of the workstation. Therefore, the workstation 30 comprises a suitable storage reading device, like a CD-drive, that can read the software from the storage device. This CD-drive is then operatively connected to the software bus too.

Figure 3:
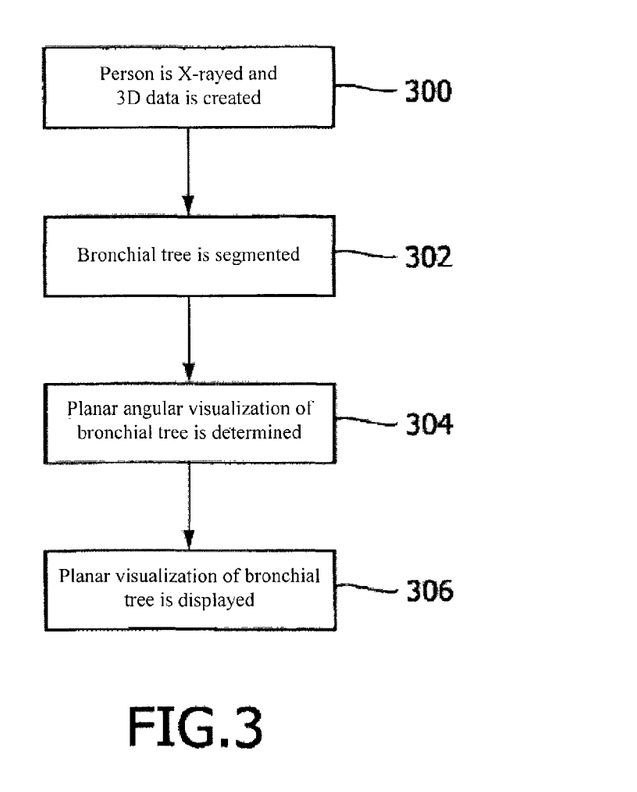
FIG. 3 is a flow chart illustrating the method for creating a planar angular visualization of an anatomical tree structure according to one embodiment of the invention.

In a first embodiment of the method of the invention, with reference to FIG. 3, the following procedure is performed.

Firstly, a person is x-rayed using a multi-slice CT and a 3-D data set representing the person's bronchial tree is created using a known manner in step 300. Next, the bronchial tree is segmented from a three-dimensional image in step 302, as for instance based on the algorithm described in Schlatölter et al. (Simultaneous Segmentation and Tree Reconstruction of the Airways for Virtual Bronchoscopy, SPIE Conference on Medical Imaging, Proceedings of SPIE Vol. 4684, pp. 103-113 (2002)).

The unsupervised bronchial tree segmentation starts from the trachea and is based on a so-called front propagation approach. A region growing aggregates all voxels below a certain Hounsfield threshold. Whenever the growth front splits into different segments, a further region growing is started in each of the segments. "Leakages" into the parenchymal tissue is detected and stopped by monitoring a possible sudden increase of the growth front. After the region growing process is complete, then the centerlines (skeleton lines) of trachea, bronchi and smaller airways are extracted and a linked graph structure is built which represents the branching points of the tree structure.

Referring back to FIG. 3, a planar angular visualization of the bronchial tree structure is then determined in step 304. Finally, the planar visualization of the bronchial tree structure is then displayed in step 306.

Figure 4:
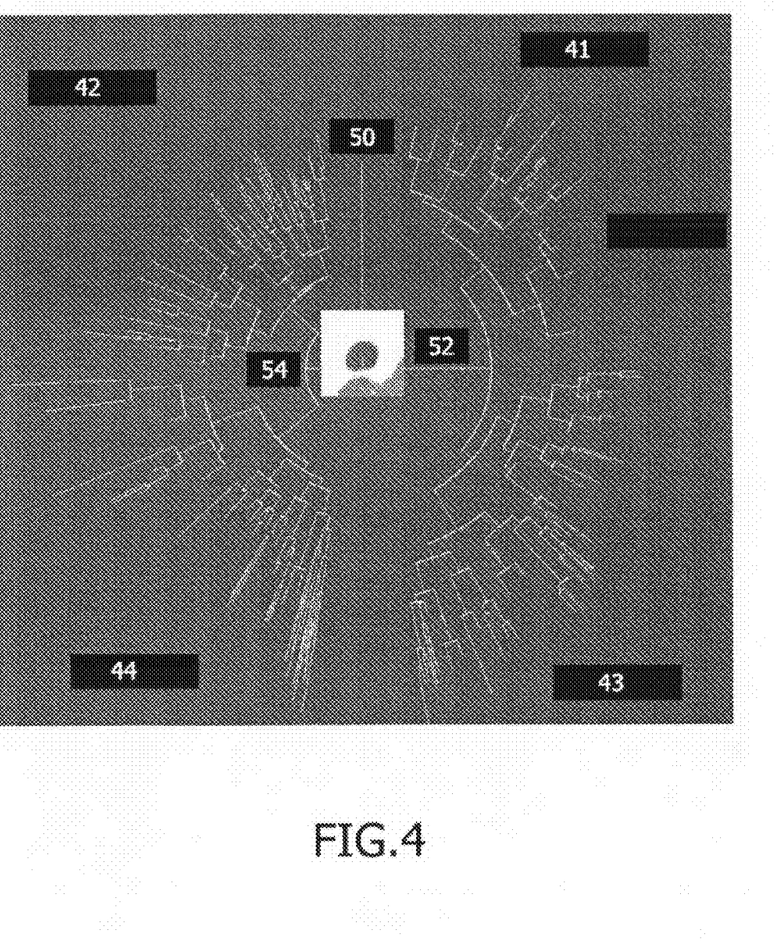
FIG. 4 illustrates a planar angular mapping of the bronchial tree extracted from a particular CT lung data set according to one embodiment of the invention.
Figure 5:
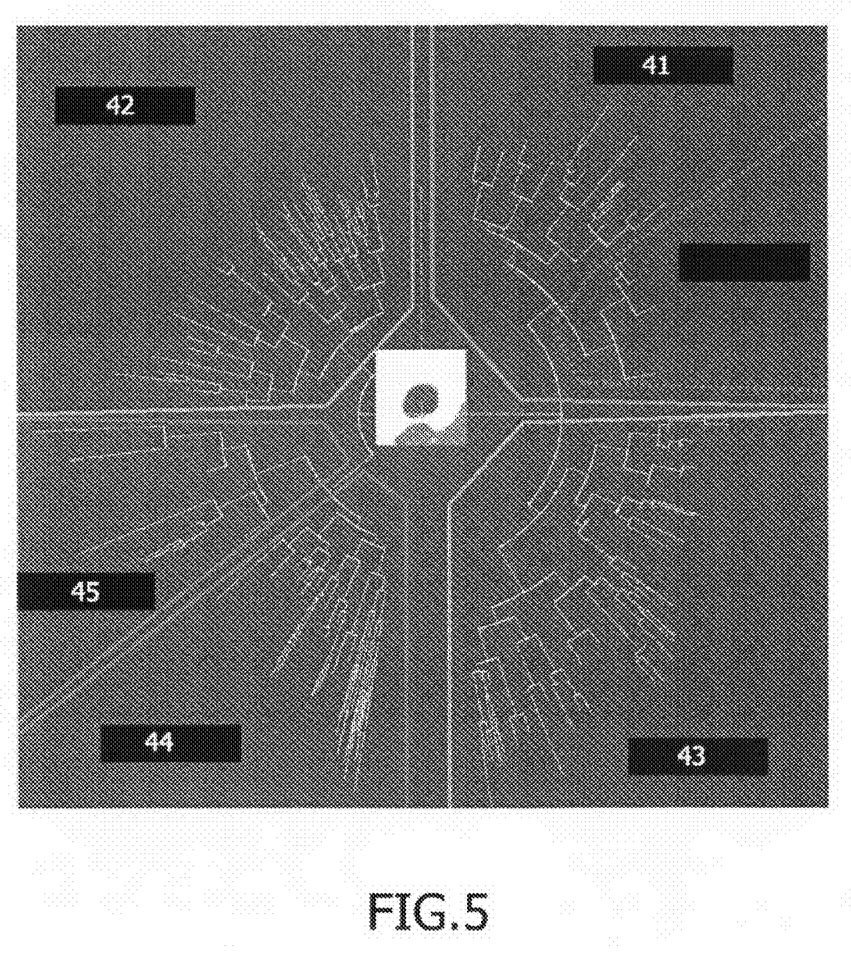
FIG. 5 illustrates a planar angular mapping of the areas of the main anatomical regions (lung lobes) according to one embodiment of the invention.

The invention suggests a two-dimensional planar mapping of the bronchial tree, as illustrated in FIG. 4, such that no occlusions or intersection of segments occur, and that the hierarchy of the segments is obvious. The true geometric relations are not preserved, but the topological relations are true as for example in a typical subway map. Moreover, the main segments point in the approximate direction of their true geometric location in a coronal projection wherein upper lung lobes (42, 41) are directed upwards and lower lung lobes (44, 43) are directed downwards as illustrated in FIGS. 4-5. FIG. 5 also illustrates a middle 45 lung lobe. The suggested planar mapping gives an overview of the bronchial tree in a single two-dimensional view, which is intuitively similar to the anatomical relations, as illustrated in FIG. 5.

Features of the planar mapping process will now be described in more detail. The main bifurcation (carina) in the trachea 50 into left 52 and right 54 main bronchus is plotted in the center of the planar diagram as illustrated in FIG. 4. All other points in the diagram are plotted such that their radial distance to the diagram center is proportional to the centerline distance through the airways to the carina, measured in millimetres independent of CT data set resolution.

Figure 7:
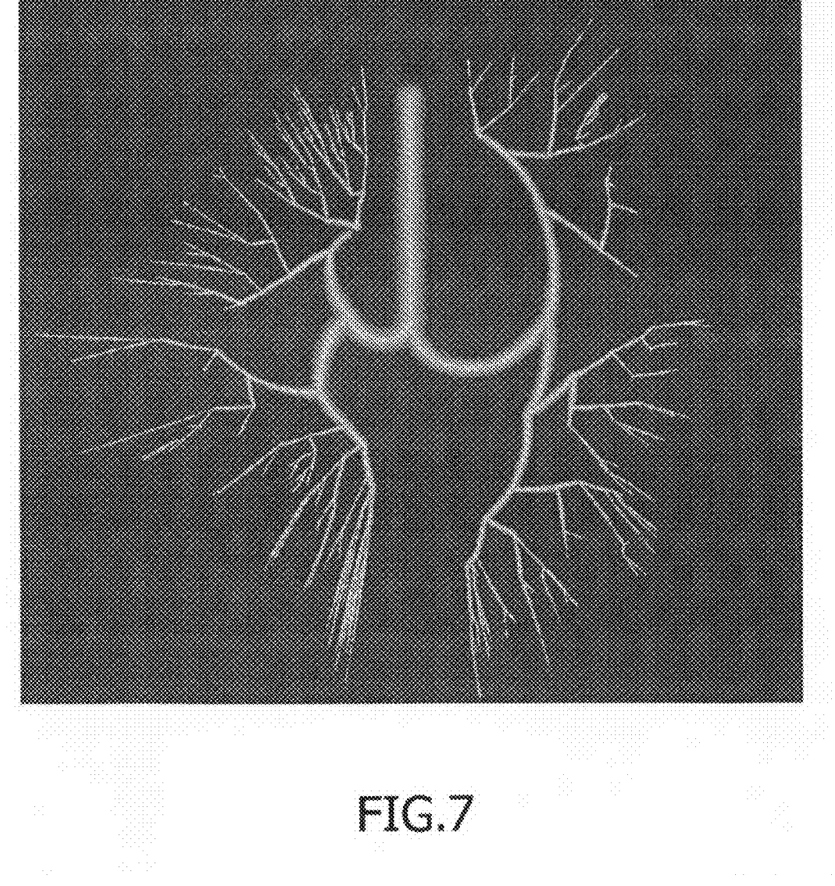
FIG. 7 illustrates an alternative display of the planar mapping of the bronchial tree as extracted from a particular CT lung data set according to one embodiment of the invention.

In this embodiment, the trachea 50 descends towards the center of the diagram, representing the carina, and then left and right main bronchi bifurcate at 90° angles. It will be understood by those skilled in the art that the angle could also be fixed at another value, for example, as illustrated in FIG. 7 which will be described in more detail below. At each bifurcation of the airway, the plotted centerline branches with an equal angular step width to the left and right of the current angular direction. The angular step width decreases by a factor of ½ after each bifurcation. The bifurcations are characterized as the locations where in the above described region growing scheme the growth front has disintegrated (split).

In this way, it can be guaranteed that the subtree below a given point will not enter the diagram area of another subtree.

Each point in the mapping is given by angle and distance to the center of the diagram. The distance to the diagram center is proportional to the bronchial-path-distance to the carina, and the angle is determined by the number of previous bifurcations. So the length of a segment in the diagram is just given by the connection between the point positions determined as previously explained.

In this embodiment, the length of a segment in the diagram is not a true representation of its real length. This is not possible as the segments have to be spread out far enough to avoid overlapping. Rather, the radial distance is a true representation of the length of the airway back to the carina. In other words, the tangential distances in the diagram (on the circles) are just used to spread out the segments, but the radial distances are true.

Figure 10:
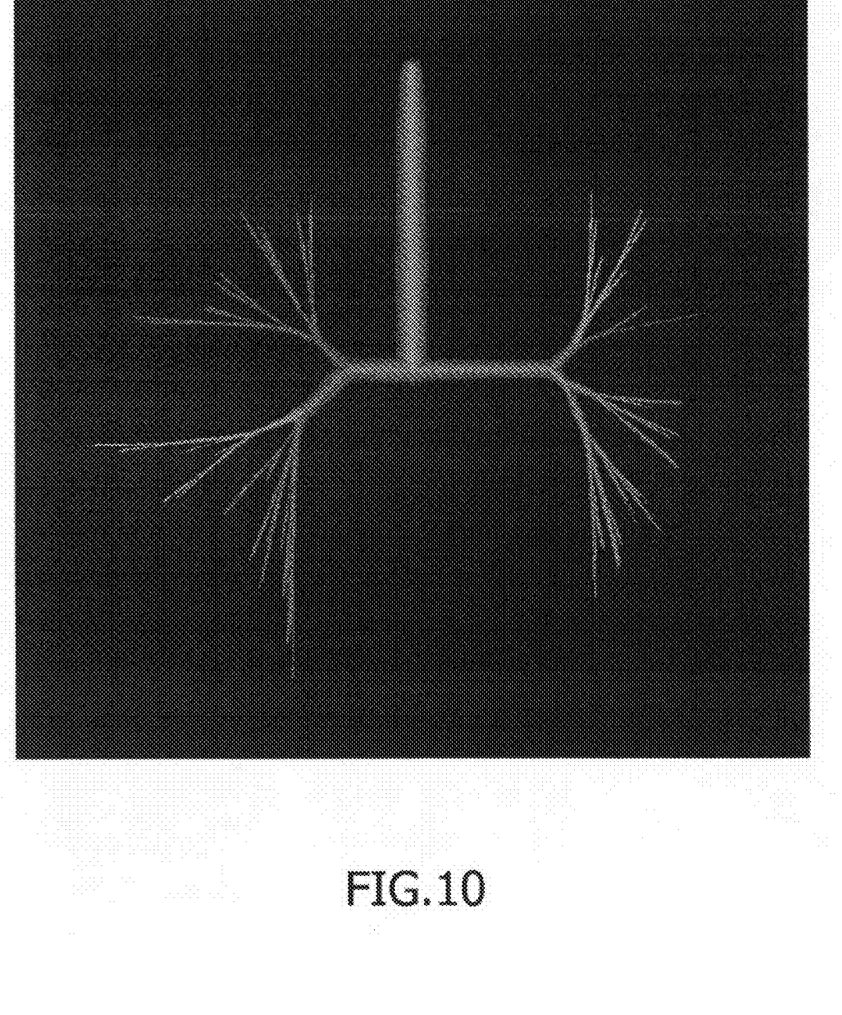
FIG. 10 illustrates a bronchial tree wherein the segments of the tree are proportional to their real length according to one embodiment of the invention.

In another embodiment of the planar mapping as illustrated in FIG. 10, it is also possible to make the length of a segment in the diagram proportional to its real length. In this alternative mode, the radial distance of a point in the diagram to the center of the diagram is not proportional to the carina-distance. Rather, a path is drawn for each segment (starting from the carina) of length proportional to its real length. Then, at each bifurcation of generation i, the mapping branches from the current direction into two new directions by an angle ±θi, and the branching angle decreases with each generation θi+1=½θi, so that occlusion-free mapping is guaranteed.

In order to improve the similarity of the diagram to the true anatomical positions, the direction of the branching in the diagram is controlled such that the one of the two subtrees which has the higher centroid (in foot-to-head direction) is chosen as the branch in the diagram which bends towards the top, whereas the other branch bends towards the bottom of the diagram.

The colors or grey scale values of the displayed diagram may be chosen such as to reflect the anatomically differentiated lobes and main segments as illustrated in FIG. 10. It will be understood by those skilled in the art that the actual displayed colors or grey scale values can be selected by the user to provide a visual image which is distinctive to the user.

The diagram may be interactive in a way that a mouse click on a given point in the diagram will set another display device such as an orthoviewer directly to the place in the three-dimensional CT data set which is represented by the click-on point in the planar mapping. The diagram may be interactive in a way that a mouse click on a given point in the diagram selects the airway centreline path from this point to the trachea and displays further quantitative information along this path, such as lumen diameter, bronchial wall thickness, etc. The diagram may be interactive in a way that a mouse movement over a certain diagram region magnifies this region such that also higher orders of tree generations become discernable.

Figure 6:
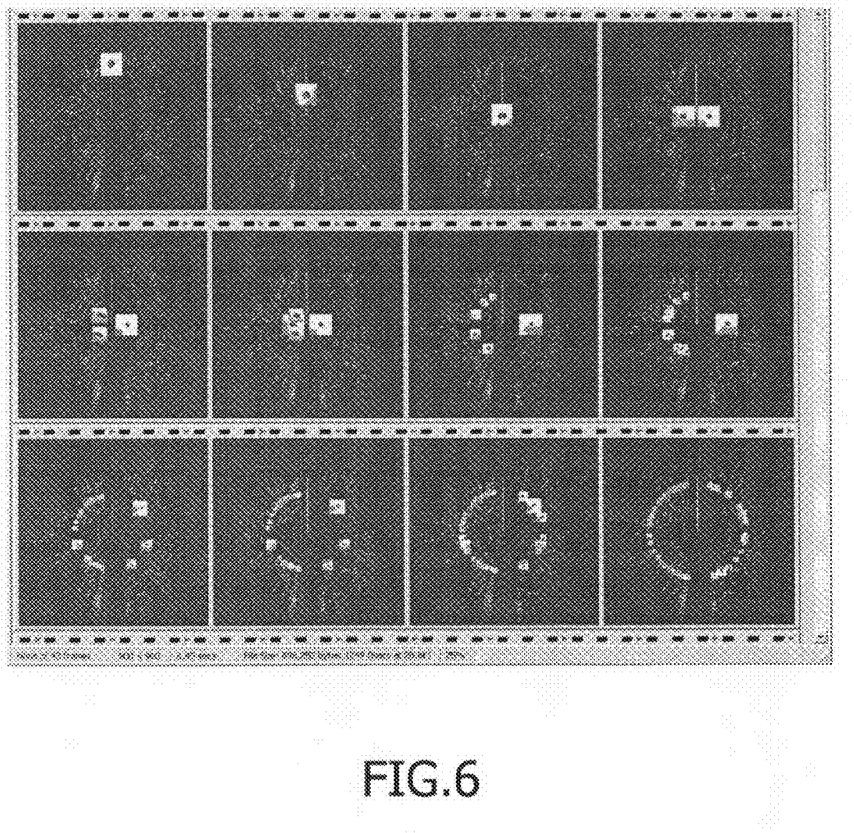
FIG. 6 illustrates various reformatted images according to one embodiment of the invention.

A further feature allows the user to move a slider in a graphical user interface such that for all of the points in the tree which have the specified distance from the carina, a perpendicular reformatted image is shown in the corresponding position in the diagram and moving the slider allows changing the specified carina distance, as illustrated by the images in FIG. 6. An alternative display of the planar mapping indicating the airway lumen diameter in relation to the carina distance is illustrated in FIG. 7.

The diagram can be drawn such that the line thickness at each point of the diagram is proportional to the measured airway lumen diameter at the corresponding point in the bronchial tree. The different line thickness is illustrated in FIG. 7.

The diagram can be drawn such that smooth angular interpolation is used to give a more organic appearance as illustrated in FIG. 7. The bifurcations are at the same positions as in FIGS. 4-5, wherein position is defined by the number of earlier bifurcations and length to carina, but between the bifurcation points the centreline points are linearly interpolated in their angle and radial distance ($\rho$ and $\phi$ coordinate).

The diagram can be drawn such that the bronchial wall thickness at each point of the diagram is proportional to the measured wall thickness at the corresponding point in the bronchial tree.

Anomalies in the bronchial lumen diameter and wall thickness can be automatically detected and pointed out by markers or color coding at the respective positions in the diagram. Also, another image processing module can find at each point of the bronchial tree the accompanying artery. The diameter of the accompanying artery can be automatically measured. Then the ratio between the bronchial diameter and the arterial diameter (which is an important clinical parameter) can be color-coded into each point of the planar mapping.

Another application of the planar mapping is to map the segmented pulmonary arterial vessel tree, and to render at each point of the graph the vessel diameter or any possibly detected anomalies. For example, at each point of the graph, the minimum projection of the CT-Hounsfield values at this vessel portion can be rendered, so that filling defects (caused by clots, and possibly indicating pulmonary embolisms) can be detected at a single glance.

Figure 8:
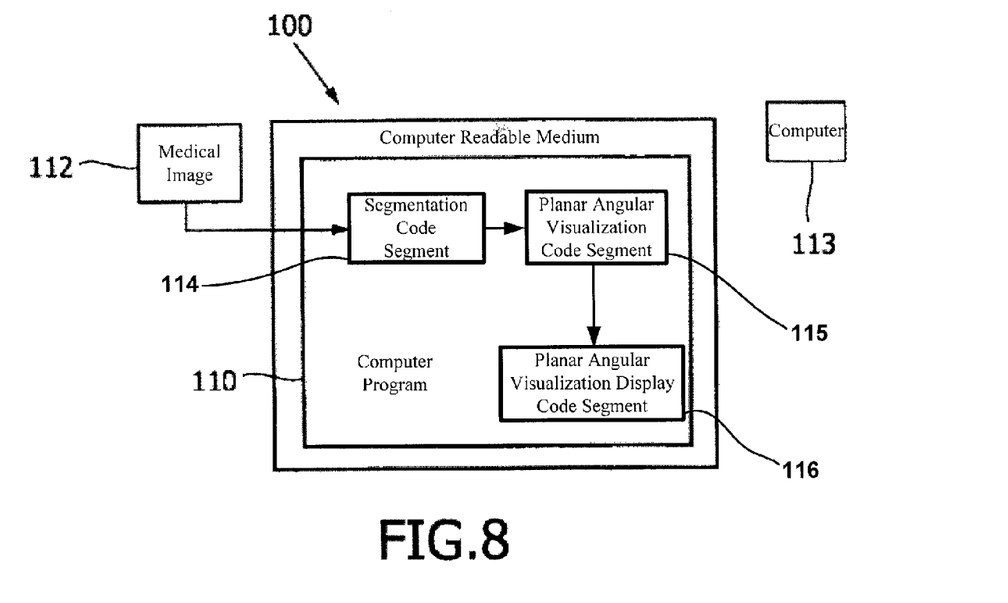
FIG. 8 schematically illustrates a computer readable medium according to one embodiment of the invention.

In another embodiment of the invention according to FIG. 8, a computer readable medium is illustrated schematically. A computer-readable medium 100 has embodied thereon a computer program 110 for automatic extraction of a planar angular visualization of an anatomical tree from a 3D medical image 112, for processing by a computer 113. The computer program comprises a code segment 114 for segmenting the anatomical tree structure from a three-dimensional image set of at least a portion of a body, a code segment 115 for determining a planar angular visualization of the anatomical tree structure, a code segment 116 for displaying the planar angular visualization of the anatomical tree structure.

FIG. 9 illustrates an exemplary medical image workstation 119 according to a further embodiment of the present invention. The medical workstation is arranged for implementing the method of the invention, and configured to receive and process a 3D medical image. Preferably the workstation is arranged to run the above described program code segments in order to perform the method according to the invention. According to the embodiment, the medical workstation 119 is configured for automatic extraction of a planar angular visualization of an anatomical tree from a 3D medical image, and comprises segmenting means 120 for segmenting the anatomical tree structure from a three-dimensional image set of at least a portion of a body, determination means 121 for determining a planar visualization of the anatomical tree structure, displaying means 122 for displaying the planar angular visualization of the anatomical tree structure. Said means 120-122 are preferably electronic components operatively connected to each other in a suitable way. Other components of the medical workstation as e.g. display(s) or pointer actuating devices are not illustrated or discussed in detail.

The invention can be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to (a) specific embodiment(s), it is not intended to be limited to the specific form set forth herein. Rather, the invention is limited only by the accompanying claims and, other embodiments than the specific above are equally possible within the scope of these appended claims, e.g. different anatomical tree structures than those described above.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A system for visualizing an anatomical tree structure comprising:

segmenting means for segmenting the anatomical tree structure from a three-dimensional image set of at least a portion of a body;

determination means for determining a planar visualization of the anatomical tree structure, wherein the planar visualization of the anatomical tree structure includes no occlusions or intersections of segments.

2. The system according to claim 1, further comprising:
displaying means for displaying the planar angular visualization of the anatomical tree structure.

3. The system according to claim 2, wherein a displayed length of each segment of the anatomical tree structure is proportional to the real length of each segment.

4. The system according to claim 3, wherein at each bifurcation of generation i, the planar visualization of the tree structure branches from a current direction into at least two new directions by a branching angle $\pm\theta_i$, and the branching angle decreases with each generation $\theta_i+1=\frac{1}{2}\theta_i$.

5. The system according to claim 2, wherein said displayed planar visualization of the tree structure is interactive.

6. The system according to claim 2, wherein a displayed width at each point of the displayed planar visualization of the tree structure is proportional to a measured airway lumen diameter at a corresponding point in the anatomical tree structure.

7. The system according to claim 1, wherein the anatomical tree structure is a bronchial tree.

8. The system according to claim 7, further comprising:
determination means for determining anomalies in bronchial diameter and wall thickness.

9. The system according to claim 1, wherein the anatomical tree structure is a pulmonary arterial vessel tree.

10. Image acquisition device comprising the system according to claim 1.

11. Image workstation comprising the system according to claim 1.

12. A method of visualizing an anatomical tree structure, comprising the steps of:
segmenting the anatomical tree structure from a three-dimensional image set of at least a portion of a body;
determining a planar angular visualization of the anatomical tree structure,
wherein the planar angular visualization of the anatomical tree structure includes no occlusions or intersections of segments.

13. The method according to claim 12, further comprising the step of:
displaying the planar angular visualization of the anatomical tree structure.

14. The method according to claim 12, further comprising the step of determining anomalies in a diameter and wall thickness of the anatomical tree structure wherein the anomalies are color coded on the displayed planar visualization of the tree structure.

15. The method according to claim 12, wherein the anatomical tree structure is a bronchial tree, further comprising the steps of:
determining a diameter of an accompanying artery for any point on the bronchial tree;
determining a ratio between the bronchial diameter and the arterial diameter.

16. A non-transitory computer-readable medium having embodied thereon a computer program for automatic extraction of an anatomical tree structure for processing by a computer, the computer program comprising:
a code segment for segmenting the anatomical tree structure from a three-dimensional image set of at least a portion of a body;
a code segment for determining a planar angular visualization of the anatomical tree structure,
wherein the planar angular visualization of the anatomical tree structure includes no occlusions or intersections of segments of the anatomical tree structure.

17. The computer-readable medium according to claim 16, further comprising:
a code segment for displaying the planar angular visualization of the anatomical tree structure.

* * * * *